United States Patent [19]

Bullock

[11] Patent Number: 4,479,912

[45] Date of Patent: Oct. 30, 1984

[54] FIBER BOARD COMPOSITION

[75] Inventor: Ralph Bullock, Irvington, Ill.

[73] Assignees: Bernadine A. Eggan, Lake Forest; David L. Mize, Vienna, both of Ill.

[21] Appl. No.: 421,585

[22] Filed: Sep. 22, 1982

Related U.S. Application Data

[63] Continuation-in-part of Ser. No. 313,183, Oct. 20, 1981, abandoned.

[51] Int. Cl.$^3$ .................................................. B06B 3/00
[52] U.S. Cl. ........................................ 264/23; 264/25; 264/109; 264/122; 427/57; 427/212; 428/283; 428/326; 428/920
[58] Field of Search .................... 427/57, 212; 264/23, 264/25, 109, 122; 428/326, 283, 920

[56] References Cited

U.S. PATENT DOCUMENTS

| | | | |
|---|---|---|---|
| 3,880,975 | 4/1975 | Lundmark | 156/62.6 |
| 3,916,059 | 10/1975 | Molloy et al. | 428/298 |
| 4,110,397 | 8/1978 | Wooler | 264/109 |
| 4,127,636 | 11/1978 | Flanders | 428/910 |

*Primary Examiner*—James J. Bell
*Attorney, Agent, or Firm*—Harvey B. Jacobson

[57] ABSTRACT

A fiber board composition and a fiber board composite formed therefrom is capable of consolidation into a variety of structural building products ranging from flat sheets and panels which may interlock for modular housing to 2×4's through 2×12's, etc. Fiber boards comprised of the fiber board composition of the present invention are characterized by high strength, fire resistance, water resistance and insect and rot resistance. The fiber board composition comprises lignocellulosic particles, such as softwood or hardwood waste particles, which have been pressure treated to resist insects and rot with a chemical compound, such as chromated copper arsenate, before board consolidation; a vegetable matter derivative for increased strength, such as hominy feed; a fire retardant chemical, such as alumina tri-hydrate; and a water retardant chemical, such as casco wax, which are then consolidated into the formed fiber board structure by means of about 4 to about 10% by weight of a phenolic-type resin, pressures of about 400 to about 600 psi, heat of about 320° to about 360° F. and ultrasonic sound with a frequency of about 3.6 to 3.7 mega hertz (million cycles per second). The amount of chemicals and/or other components to be added to the composite mixture will vary according to the desired result in each of the specified categories characterized by strength, fire resistance, water resistance and insect and rot resistance.

10 Claims, No Drawings

FIBER BOARD COMPOSITION

CROSS REFERENCE TO RELATED APPLICATION

This application is a continuation-in-part of my co-pending application U.S. Ser. No. 313,183, filed Oct. 20, 1981 for FIBER BOARD COMPOSITION, now abandoned.

BACKGROUND OF THE INVENTION

1. Field of the Invention

This invention relates to improvements in fiber board products formed, through a number of special processes, from consolidated comminuted lignocellulosic materials and, more particularly, to a variety of fiber board products of improved physical characteristics formed by pressure treated comminuted lignocellulosic woody materials, adhesive binders and ultrasonic sound. Furthermore, the present invention relates to fiber board compositions comprising pressure treated comminuted lignocellulosic woody material, adhesive binder and specified chemicals to yield, upon consolidation, a variety of structural building products of improved physical characteristics (high strength, fire resistance, water resistance, insect and rot resistance).

At present, boards made from wood and other lignocellulosic particles and the conventionally used thermosetting binder for consolidation of the particles have been shaped into panels or other shapes for limited applications. Often times, such fiber board products have included therein a particular combination of particulate filament material which is added for the purpose of improving desired characteristics of the finished fiber board product. For example, certain fibrous materials have been incorporated in the fiber board product in a specific orientation or fiber board products have been formed by distinct lamina, each lamina including a desired orientation of the added fibrous component. Obviously, such fiber board products can only be manufactured by relatively expensive processes in which specialized equipment is required in order to orient the fiber additions in the proper direction. Accordingly, while such fiber board products may have the desired physical characteristics, the expense of such products becomes prohibitive and use thereof extremely limited.

Similarly, there are no presently avilable structural fiber board products, in particular those made from comminuted lignocellulosic particles, which have sufficiently high strength, fire resistance, water resistance, and insect and rot resistance and are of a cost that allows such products to be readily utilized in home construction such as for walls and roof, ceilings and floors. Without forming fiber board products by time-consuming, energy-inefficient and expensive processes, the art has not provided a relatively inexpensive natural lumber substitute having the equivalent or much improved physical properties of natural lumber products, especially fiber board products which can be used readily as structural elements in building construction.

2. Disclosure Statement

U.S. Pat. No. 4,127,636, issued Nov. 28, 1978, to Flanders, discloses a process for making a reinforced board from lignocellulosic particles in which comminuted lignocellulosic particles, binders and other additives and additionally a plurality of elongate reinforcing filaments comprising a plurality of short filaments such as glass fibers or steel wires are distributed uniformly throughout the particle and binder mixture in a random orientation so as to extend generally in all directions. For board applications having greater flexural strength and stiffness requirements, the reinforcing filaments comprise a series of long filaments specifically oriented straightly in a predetermined direction corresponding to the direction of expected tensile strength and in a parallel arrangement spaced transversely from one another. The lignocellulosic particles which can be utilized are preferably woody particles such as sawdust, bark, etc., but the resultant product can also employ any fibrous lignocellulosic material including various grain and vegetable products such as corn stocks, either alone or in mixture with one or more of the other types of lignocellulosic materials. Additionally, the patent discloses that the ideal ratio of binder to lignocellulosic particles is between about two and six parts of binder to ten parts of particles by weight.

U.S. Pat. No. 3,916,059, issued Oct. 28, 1975, to Molloy et al, discloses crossbanding sheets which are made of a combination of glass fibers and cellulose fibers held together by a synthetic resin binder extending throughout the sheet, the fibers of the crossbanding sheets oriented in a direction perpendicular to the direction of orientation of wood chips or grain of a wood core to which the crossbanding sheets are adhered. The sheets comprise a combination of glass fibers and cellulose fibers in which the glass fibers are present in amounts of 5 to 85% by weight of the total fibers with the cellulosic fibers present in an amount of 95 to 15% of the total fibers. It was found that sheets made with 50 to 75% glass fibers and 50 to 25% cellulose fibers have been found to be particularly satisfactory. The binder which is preferably a thermosetting one can constitute about 20 to 60% of the weight of the final sheets.

U.S. Pat. No. 3,880,975, issued Apr. 29, 1975, to Lundmark, discloses a thin, continuous web produced from a starting material containing at least a major part of defibrated lignocellulose plant substances and a mixture of resinous binding agents amounting to at most 10% of the weight of the final product by first causing the starting materials to form a continuous porously felted fiber mat and subsequently feeding the fiber mat between a pair of cooperating nip-forming press rollers which are heated to a minimum temperature of 160° C., the continuous web thus produced may be subjected to further treatment in order to obtain the required properties. In addition to lignocellulose fibers and resin binders, the starting material may include up to one-third of other kinds of fibers such as mineral fibers including asbestos, glass and rockwool fibers; animal textile fibers, vegetable textile fibers. It is further recommended to impregnate the fibers included in the starting materials with small amounts of moisture repellants, fire retarders, fungicides, insect repellants, etc.

U.S. Pat. No. 4,110,397, issued Aug. 29, 1978, to Wooler, discloses an improvement in the molding process for composite bodies of sheets, especially those from lignocellulosic material in which an isocyanate binding agent is used, the improvement being the provision of a metallic soap at the interface of the composition and mold surface to assist release. This patent defines lignocellulosic material as wood chips, wood fibers, and the like and/or fibers from other natural products which are lignocellulosic, for example, straw, dried rushes, reeds and grasses and may further include ground nuts and hulls from cereal crops. Additionally, there may be mixed with the lignocellulosic materials inorganic flake or fibrous material, for example, glass fiber, mica and asbestos.

SUMMARY OF THE INVENTION

In accordance with the present invention, a fiber board product of improved physical characteristics including strength, fire-resistance, water resistance and insect and rot resistance is formed from a fiber board composition comprising pressure treated comminuted lignocellulosic woody material, a vegetable matter derivative to increase strength, specified chemicals to produce the fire, water, rot and insect resistance of the product, and a synthethic phenolic type resin binder to consolidate the materials into a variety of structural board products. The fiber board products of the present invention are formulated from a fiber board composition which yields the improved properties upon consolidation and allows the manufacture of the improved fiber board products to be accomplished relatively inexpensively such that the formed products can be readily available to the building industry at low cost, even fiber board products having value as structural elements to the building industry. The fiber board compositions of the present invention comprise pressure treated comminuted lignocellulosic woody material, a vegetable matter derivative, specific chemicals and a phenolic type adhesive binder all of which are consolidated into fiber board products of varying size ranging from 2×4's to flat sheets that are of comparable strength as natural lumber products and yet are inexpensive, and can be produced in a standard size as substitutes for all shapes and sizes of natural lumber products.

The term "lignocellulosic material" includes wood chips, wood fibers, shavings, sawdust and the like waste products from the wood-working industry, and fibrous material from other natural products which are lignocellulosic, for example, hominy feed, which is a mixture of corn bran, corn germ and a part of the starchy portion of corn kernels. Lignocellulosic materials disclosed in the above-mentioned patents may also be utilized, but are not preferred because of the increasing strength characteristic of the hominy feed.

In general, the fiber board composition comprises 55 to 76% by weight lignocellulosic woody material. The amounts of the lignocellulosic woody material will be determined by the use of the product formed and the physical properties required. The vegetable matter derivative, hominy feed, comprises 15 to 25% by weight of the fiber board composition and will be determined by the strength required for a particular application. The wax comprises 1 to 3% by weight, the chromated copper arsenate comprises 1 to 1.5% by weight, the alumina tri-hydrate comprises 3 to 5% by weight and the phenol formaldehyde resin comprises 4 to 10% by weight. The amounts of wax, chromated copper arsenate, alumina tri-hydrate and phenol formaldehyde resin will be determined by specific applications of the consolidated fiber board.

Consolidation of the pressure treated lignocellulosic woody material, vegetable matter derivative and chemicals is accomplished in stages utilizing a phenolic type resin adhesive, specifically phenol formaldehyde resin. The phenolic resin is utilized in amounts ranging from 4 to about 10% by dry weight basis of the total composite mixture. Other resins may be used, but phenol formaldehyde resin is preferred because of its benefits in water resistance.

Stage 1 of the process includes pressure treatments for a specific amount of time of the individual components of the lignocellulosic woody material of the composite mixture with a chemical compound known as chromated copper arsenate. This particular process has never been accomplished before for fiber board compositions, especially for commercially usable building material. The normal process of pressure impregnation of chromated copper arsenate on natural lumber products is accomplished only after the product has been fabricated. This normal process is not practical or acceptable on fiber board compositions, because of the extremes in swelling during the pressure impregnation process. The adaptation of the normal process to one of pressure impregnating individual components of the lignocellulosic woody material is highly effective, both on softwoods and hardwoods. After the pressure impregnation process is completed, the wetted lignocellulosic woody material is dired to an acceptable usable level of about 5 to 12% moisture.

Stage 2 of the process involves mixing the pressure impregnated chromated copper arsenate lignocellulosic woody material with the vegetable matter derivative, hominy feed, and the chemicals which produce the fire and water resistance. The fire resistance is accomplished by the addition of alumina tri-hydrate ($Al_2O_3$); partial water resistance by the addition of casco wax; and the rot and insect resistance by the already pressure impregnated chromated copper arsenate lignocellulosic woody material. The chemicals and vegetable matter are mixed with the dried lignocellulosic woody material in a container or drum, which produces a tumbling action, thereby assuring even distribution of all component parts throughout the composite mixture. After the mixing is completed, the composite mixture is ready for consolidation in stage 3, with the introduction of the adhesive binder.

Stage 3 is the consolidation phase of the process. The dried composite mixture from stage 2 is transferred to another container or drum for final tumbling prior to being laid out in mats for pressing. During this tumbling period, the composite mixture is sprayed with a phenol formaldehyde resin, usually 6% by dry weight of the total composite mixture, until the mixture is thoroughly saturated with the resin. When this point is reached, the composite mixture is then ready to be formed up into mats for pressing. The consolidation of the composite mixture into fiber board products is accomplished by hot pressing at temperatures of about 320° to 360° F., pressures at about 400 to about 600 psi for about 3 to about 5 minutes. Normal press time duration is about 15 minutes, but by utilizing ultra sonic sound of about 3.6 to about 3.7 mega hertz (million cycles per second) to speed curing time of the mats, the press time duration can be reduced from 300 to about 500% and result in a product that has a uniform density throughout, thereby creating a stronger and more usable material.

Accordingly, it is an object of the present invention to provide a fiber board product which can be formed into a variety of shapes and sizes as a substitute for structural natural lumber products.

It is another object of the invention to provide a fiber board product, which is economical, can be mass-produced into a standard size, and has the high strength and fire, water, rot and insect resistance necessary for ready use by the building industry, without further modifications.

Another object of the invention is to provide a lignocellulosic fiber board composition which can be consolidated into a variety of fiber board products of improved strength and sufficient fire, water, rot and insect resistance at costs which allow the products to be readily available to the building industry.

These objects and advantages will be subsequently clarified and become apparent in the detailed description of the invention.

DETAILED DESCRIPTION OF THE INVENTION

The present invention can best be described by referring to the following example of a fiber board composition and the process of forming the composition into consolidated fiber board products. It will, of course, be understood that the invention is not to be strictly limited to the specific example described below. Materials utilized in the fiber board composition will remain the same, but with variations in quantities of material used depending on the desired result. The pressure impregnation process of the lignocellulosic woody material before consolidation will remain constant because of its necessity in producing the end product.

EXAMPLE

A fiber board in accordance with the present invention is manufactured by adding to a mixture of chromated copper arsenate impregnated wood particles, a vegetable matter derivative, hominy feed and specific chemicals to produce fire and water resistance, a phenolic type resin adhesive binder, phenol formaldehyde resin, followed by subjecting the mixture to heat, pressure and ultrasonic sound to consolidate the composite mixture into the desired fiber board shape.

Preparation of Lignocellulosic Woody Material

In all instances of chromated copper arsenate impregnation, the wood material used is natural lumber in an already fabricated form, 2×4's, 2×6's, etc. This process is well known and widely used in the industry. From the standpoint of regular fiber board, the normal impregnation process is not possible on fabricated boards because the pressures used to impregnate the chromated copper arsenate cause unacceptable swelling in fiber board to a point of making the board useless as a structural member. What this invention calls for is to pressure impregnate the individual pieces of lignocellulosic woody material prior to mixing and consolidation. The process involves selecting the required amount of wood chips, softwood or hardwood, not to exceed 1/16 inch diameter, and other wood waste, specifically sawdust. This material is loaded into a retort pressure cylinder, in a specially constructed perforated cylinder capable of holding the small size material used for the mix. The retort is sealed and a vaccum is drawn on the entire cylinder. The chromated copper arsenate is introduced until the retort is full and a pressure of 120 to 125 psi, pounds per square inch, is introduced. The normal time duration for natural lumber is from 10 to about 30 minutes, depending on the quantity of heartwood present in the fabricated material. Heartwood will not impregnate to any great degree when part of a fabricated piece of natural lumber material. This poses no great problem in the composite mix, because of the particle size, so the low end of the time spectrum is sufficient for impregnating the wood particles of the mix. After the lignocellulosic woody material is fully impregnated, it is removed from the retort and transferred to drying kilns. For normal drying of fabricated natural lumber products, the temperatures are strictly regulated and drawn up slowly to a maximum temperature of 180° F. over a period of 6 to 8 hours, to prevent warping and twisting. After the maximum temperature is reached, it is held for about 48 to about 72 hours. This entire drying cycle can be altered using the lignocellulosic woody material, because there is no warping or twisting possible on such small pieces of wood. The maximum of 180° F. can be accomplished extremely fast with no detrimental effect, and the total drying time can be reduced substantially down to 48 hours maximum. This yields a mix of about 5 to 12% moisture, and is now ready to go to stage 2, which is the primary mixing phase.

Primary Mixing Phase

This stage of the process involves the mixing of all the components that go together to form the fiber board product with the exception of the adhesive resin binder. That includes the chromated copper arsenate impregnated lignocellulosic woody material; the vegetable matter derivative, hominy feed; the fire retardant chemical, alumina tri-hydrate; and the water retardant agent, casco wax. These components all perform in a specified way to produce the desired result.

The chromated copper arsenate makes the wood chips and sawdust insect and rot resistant by making the food supply, the wood fiber itself, unpalatable to the insects and rot. The vegetable matter derivative, hominy feed, which is a mixture of corn bran, corn germ and a part of the starchy portion of the corn kernals, is a by-product of the dry corn milling industry. This hominy feed, when heated beyond 300° F., which the temperature for pressing fiber board always exceeds, becomes a very high viscosity liquid when mixed with the adhesive binder. The hominy feed acts as a secondary binder and tends to create a much stronger end product. The alumina tri-hydrate ($Al_2O_3$), in the form of a low viscosity powder, is a combination of 65% alumina tri-hydrate and 35% calcium carbonate. It acts as a fire retardant through the use of a specified temperature release point. When the temperature reaches 400° F., the release point is reached, thereby releasing water vapor, which tends to impede fire movement. The casco wax, when mixed in the composite mixture, with the phenol formaldehyde resin together form a portion of the water retardant capability of the fiber board.

The dried lignocellulosic woody material, vegetable matter and chemicals are mixed together in a large container or drum, which produces a tumbling action, thereby assuring even distribution of all component parts throughout the composite mixture. The material after mixing is monitored by a radioactive device, which ensures the correct density is maintained prior to pressing. At this point, the primary mixing phase is completed and the mixture is ready to go into the final mixing phase, which includes the introduction of the phenol formaldehyde resin just prior to board consolidation.

Final Mixing and Consolidation Phase

This final stage of the process consists of adding the phenol formaldehyde resin to the composite and consolidation of the resin-charged mixture. The dried composite fixture from the primary mixing stage is transferred to another container or drum adjacent to the press for charging with resin. The mixture is tumbled at a relatively low speed while being sprayed with a 4 to about 10% mixture of phenol formaldehyde resin (6% is normal). It continues to be tumbled until the composite is fully saturated with resin. At this time, the composite is transferred to a hopper, which lays out the mat prior to pressing. The consolidation is accomplished by hot pressing the mixture at a temperature of about 320° to 360° F. and a pressure of about 400 to about 600 psi. The utilization of ultrasonic sound equipment allows temperatures at the low end of the spectrum to be used and allows press time duration to be reduced significantly. Because the sound frequency levels used are in the 3.6 to about 3.7 mega hertz (million cycles per second) range, heat is produced which causes the phenol formaldehyde resin to cure more evenly and quickly throughout the entire board and not just on the outer skin. The time on a normal press cycle is about 15 minutes, but through the use of high frequency the time can be reduced down to about 3 to 5 minutes, which is a reduction of from 300 to 500%. The more even curing produces a board with a constant density throughout. At the end of the press cycle, the board is removed from the press and allowed to cool to a temperature below 100° F. At this point, the board is sprayed with a penetrating type petroleum distillate, which is composed of 10% solids and 90% mineral spirits. The reason for letting the board cool below 100° F. is because the compound has a flash point of 104° F. What this compound does is to permanently seal one side of the board from moisture entry for use in exterior type situations. The casco wax and phenol formaldehyde resin, in conjunction with the petroleum distillate, makes the board virtually water retardant.

The foregoing is considered as illustrative only of the principles of the invention. Further, since numerous modifications and changes will readily occur to those skilled in the art, it is not desired to limit the invention to the exact composition as described under the detailed description of the invention. Accordingly, all suitable modifications and equivalents may be resorted to, falling within the scope of the invention.

What is claimed is as follows:

1. A process for making an improved fiber board product consisting of pressure impregnation of lignocellulosic woody particles with chromated copper arsenate to resist insects and rot; mixing a special vegetable matter derivative, hominey feed, in combination with phenol formaldehyde resin with the lignocellulosic woody particles to increase strength and adhesion; mixing a low viscosity form of alumina tri-hydrate to the mixture as a fire retardant; mixing casco wax and a penetrating type of petroleum distillate to the mixture as water retardants; forming a mat from the mixture; pressing the mat into a fiber board product under heat and pressure while subjecting the mat to ultrasonic sound to speed curing time and create a more uniform structural density in the fiber board product.

2. The process of claim 1, in which individual lignocellulosic woody particles are pressure impregnated with chromated copper arsenate prior to board fabrication by pressures of from 120–125 psi, for about 10 minutes, and kiln drying the mixture for 48 hours or less at a maximum drying temperature of about 180° F., with the small size particles enabling elimination of concern over warping and twisting of such small size particles, which allows a maximum drying temperature of 180° F. to be reached in a shorter period of time.

3. The process of claim 1, in which the vegetable matter derivative, hominy feed, and the phenol formaldehyde resin are combined in the presence of temperatures in excess of 300° F. which forms a very high viscosity liquid which forms a secondary adhesive binder, thereby creating an increased adhesion effect which increases the strength of the final product.

4. The process of claim 1, wherein the alumina trihydrate possesses a relatively low temperature release point of about 400° F. and mixes thoroughly and evenly with the other components of the composite mix, thereby creating a higher level of fire retardance than can be found in conventional fiber board products.

5. The process of claim 1 wherein the water retardants are applied externally after pressing is completed; the phenol formaldehyde resin working in combination with the water retardants to produce a higher level of water retardance than can be found in conventional fiber board products.

6. The process of claim 1 wherein the ultrasonic sound has extremely high frequencies, in the 3.6 to 3.7 mega hertz range, which allows the use of reduced pressing temperatures and press duration time savings of from 300 to 500%, which allows the resin to cure more evenly and quickly, thereby creating a more uniform structural density and increased product strength.

7. The method of making a fiber board comprising the steps of:
   (a) pressure impregnating lignocellulosic woody particles with chromated copper arsenate;
   (b) kiln drying the impregnated lignocellulosic woody particles;
   (c) mixing of vegetable matter; alumina tri-hydrate and wax with the dried impregnated lignocellulosic woody particles;
   (d) adding phenol formaldehyde resin to the mixture;
   (e) forming a mat from the mixture; and
   (f) pressing the mat under heat and pressure while subjecting the mat to high frequency ultrasonic sound to cure the mat into a fiber board.

8. The method of claim 7 wherein the woody particles have a maximum outside dimension not in excess of approximate 1/16 inch, said pressure impregnating step being under a pressure of approximately 120 to 125 psi for about 10 minutes, said kiln drying step reducing the moisture of the mixture to about 5 to 12% under a temperature of about 180° F.

9. The method of claim 8 wherein the vegetable matter is a derivative in the form of hominy feed and the mixing step includes tumbling the materials to form a uniform mixture, said addition of resin includes spraying of resin onto the mixture while tumbling slowly until saturated, said pressing step being conducted at a temperature of about 320° to 360° F. with pressure of about 400 to 600 psi, said high frequency sound being in the 3.6 to 3.7 mega hertz range with the press time being about 3 to 5 minutes.

10. The method of claim 9 wherein the cured fiber board is allowed to cool to a temperature below 100° F. and spraying a penetrating type petroleum distillate onto at least one surface of the fiber board for exterior use.

* * * * *